(12) United States Patent
Worrall et al.

(10) Patent No.: US 9,477,962 B2
(45) Date of Patent: Oct. 25, 2016

(54) MONITORING FOOD PRODUCTS

(71) Applicant: Disney Enterprises, Inc., Burbank, CA (US)

(72) Inventors: John David Worrall, Clermont, FL (US); Brian R. Jones, Montverde, FL (US); Peter Stepniewicz, Winter Garden, FL (US); Jo Gray, Orlando, FL (US); David A. Francus, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/446,396

(22) Filed: Jul. 30, 2014

(65) Prior Publication Data

US 2016/0034907 A1   Feb. 4, 2016

(51) Int. Cl.
*G06F 7/08* (2006.01)
*G06Q 30/00* (2012.01)
*G01K 3/04* (2006.01)
*G01K 1/02* (2006.01)

(52) U.S. Cl.
CPC .............. *G06Q 30/018* (2013.01); *G01K 1/022* (2013.01); *G01K 3/04* (2013.01)

(58) Field of Classification Search
CPC .................................................. G06Q 30/018
See application file for complete search history.

(56) References Cited

U.S. PATENT DOCUMENTS

| 2009/0188396 A1* | 7/2009 | Hofmann | G01K 1/024 99/342 |
| 2013/0128919 A1* | 5/2013 | Austen | G01K 1/026 374/110 |
| 2013/0227971 A1* | 9/2013 | Tamborra | F25D 29/006 62/62 |

FOREIGN PATENT DOCUMENTS

CN          203106881 U   *   8/2013

OTHER PUBLICATIONS

CN203106881U. "Intelligent Spoon." Aug. 7, 2013. pp. 1-3. English Translation.*
"JUMO Process Control, Inc.: Wireless Sensing", retrieved Jul. 30, 2014, pp. 1-2, <https://www.jumoplus.com/store/home.php?cat=571>.

* cited by examiner

*Primary Examiner* — Christle I Marshall
*Assistant Examiner* — Asifa Habib
(74) *Attorney, Agent, or Firm* — Patterson + Sheridan, LLP (57) ABSTRACT

Systems, methods, and computer program products to improve food safety in a food and beverage supply chain. Embodiments disclosed herein utilize prepared product tags to continuously monitor food and beverage temperatures. The temperatures and other associated data may be wirelessly transmitted to centralized locations for aggregation and storage. Mobile devices may directly communicate with the product tags to receive the temperature data. A host of management applications may utilize the data in order to ensure that safety rules and guidelines are met, while also providing valuable business insight.

19 Claims, 6 Drawing Sheets

MONITORING FOOD PRODUCTS

BACKGROUND

1. Field of the Disclosure

Embodiments disclosed herein relate to techniques to monitor food products.

2. Description of the Related Art

Food safety is an important, ongoing issue in the food service industry. Many establishments serve food and drink to thousands of customers daily. Given the scale and amount of food prepared and served, it can be difficult to continuously monitor food quality and safety, such that customers are served food that meets all health safety standards and regulations.

SUMMARY

Embodiments disclosed herein provide systems, methods, and computer program products to improve food safety in a food and beverage supply chain. Embodiments disclosed herein utilize prepared product tags to continuously monitor food and beverage temperatures. The temperatures and other associated data may be wirelessly transmitted to centralized locations for aggregation and storage. Mobile devices may directly communicate with the product tags to receive the temperature data. A host of management applications may utilize the data in order to ensure that safety rules and guidelines are met, while also providing valuable business insight.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein use product tags to monitor attributes of food products in order to, e.g., improve safety for people consuming the food products. Generally, a user may configure each of a plurality of product tags to monitor a specific food product. The product tags may continuously take temperature readings of the food products they monitor, and transmit the data to one or more receiver devices, which may then cause the data to be stored in a centralized location (or in a plurality of separate locations). From this centralized location, the received data may be analyzed in order to detect violations of business rules, such as safe temperature ranges, shelf life, and the like, in order to improve safety. Computing devices may access the received data in order to perform any number and type of operations related to the food products. For example, and without limitation, a product tag may monitor the temperature of soup being served to customers at a buffet. If the data transmitted by the product tag indicates that the soup is too hot, an alert may be generated to notify an employee of the problem, enabling the employee to take corrective action to protect the safety of customers who may eat the soup.

As used herein, a "food product" may refer to any item that may be consumed by a person, including any type of food or drink. The product tags may be applied to any food product, including, without limitation, uncooked food products and prepared food products. Product tags applied to prepared food products that are served to customers may also include displays that output information regarding the food products to customers. Furthermore, the product tags may, at predefined intervals, take temperature readings, and wirelessly transmit the temperature, date, and time of the readings. The wireless transmission may also include a unique identifier of the product tag, which may comprise a radio frequency identifier (RFID) tag. Generally, any attribute of the food products (or their surroundings) may be monitored, such as humidity, ambient temperature, gases, vibration, bacteria counts, and the like.

Furthermore, any number of business rules related to food products, recipes, food product quality, and the like may be defined and applied to the received data from the product tags. If the business rules are violated, an alert or other notification may be generated in order to notify users that the rules have been violated. In addition, the rules may change based on the lifecycle of the food product. For example, one set of rules may apply to raw chicken, while a second set of rules may apply to cooked chicken, and a third set of rules may apply to a recipe that uses the cooked chicken as an ingredient in chicken salad. The rules that apply to the chicken salad may again be directed to the preparation, storage, and service of the chicken salad. In addition, food quality standards may apply more stringent rules for a given food product. For example, if food safety regulations state that chicken salad may not be served for consumption for longer than 2 hours, food quality standards may demand that the chicken salad cannot be served for longer than 1 hour.

Embodiments disclosed herein utilize ID and tracking technology systems and tools, integrated into operational processes, utilizing unique ID tags embedded into serving dishes and utensils for automated, unattended data collection of time, date, temperature, and location of specific perishable food products in the kitchen and at food service locations in near real time. Utilizing automated time, location and temperature monitoring during the food distribution, preparation, and service, processes can provide crucial data and "visibility" of perishable food products to increase guest satisfaction of food taste/quality, automation data collection for food safety programs, governmental auditing and compliance reporting, operational labor efficiencies and fact-based data to capture and reduce food waste to improve financial impacts on the business.

By implementing the techniques disclosed herein, the time, date, temperature, and location of food products (or the service containers or utensils) may be automatically transmitted wirelessly so that the product tags may remain in place while the data is captured and archived. Advantageously, alarm conditions are monitored such that notifications may be transmitted when alarm conditions have been breached. Furthermore, a complete system may manage the setup, download, archiving, and analyzing of all data. Additionally, floor maps or facility photos may be imported into a dashboard display for convenience in real-time monitoring and locating problem areas quickly.

Figure 1:
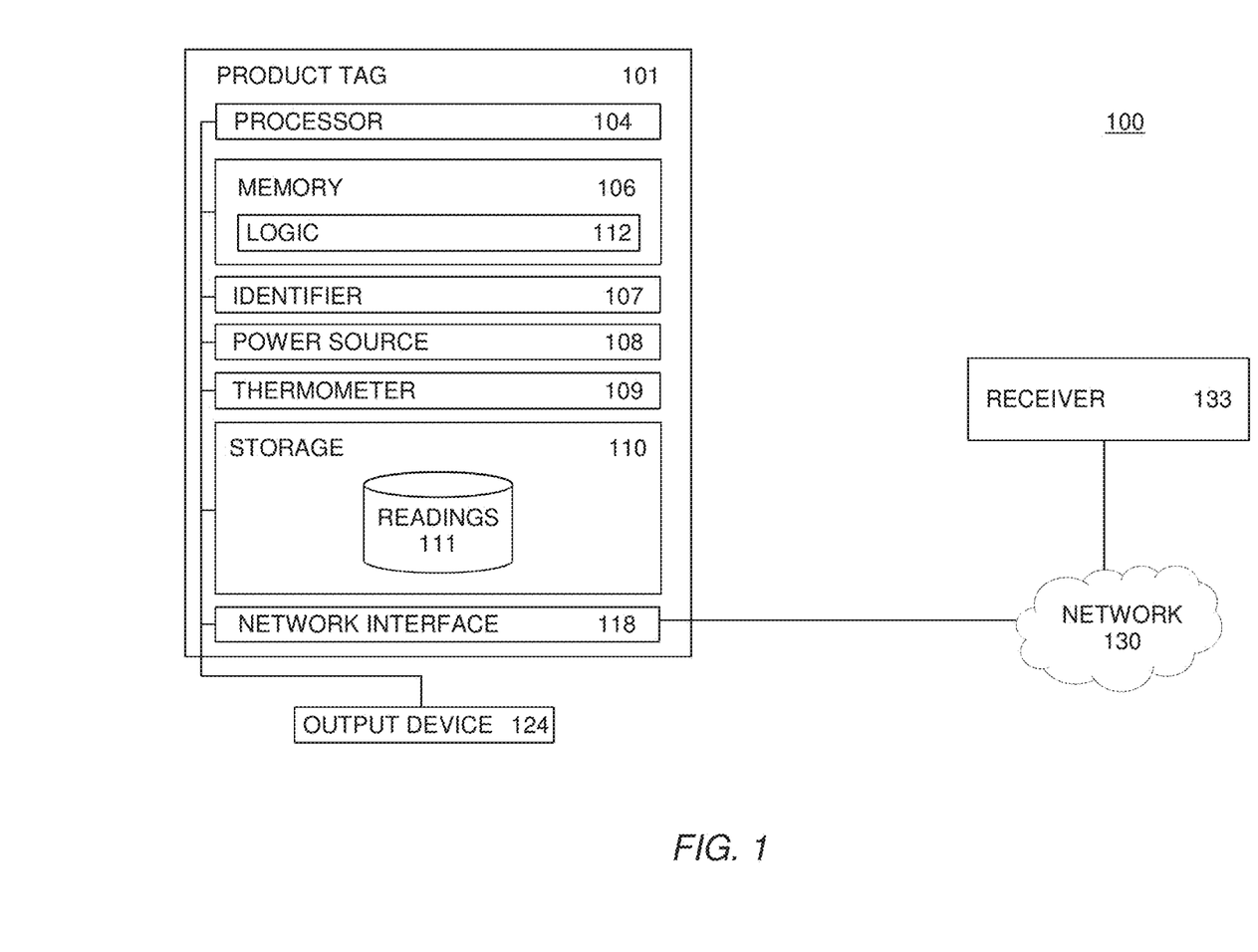
FIG. 1 is a block diagram illustrating components of a product tag to monitor food products, according to one embodiment.

FIG. 1 is a block diagram 100 illustrating components of a product tag 101 to monitor food products to improve safety, according to one embodiment. Generally, the product tag 101 is a device configured to read the temperature of a food product, and wirelessly transmit the temperature readings (and/or other attributes) to a receiver device 133. As discussed in greater detail with reference to FIG. 2, the product tag 101 may take any type of form factor.

As shown, the product tag 101 includes a processor 104 connected via a bus 120 to a memory 106, an identifier 107, a power source 108, a thermometer 109, a storage 110, a network interface 118, and an output device 124. The processor 104 may be any computer processor, and is representative of a single CPU, multiple CPUs, a single CPU having multiple processing cores, and the like. The identifier 107 may be a hardware identifier sufficient to uniquely identify the product tag 101. In one embodiment, the identifier 107 is a radio frequency identifier (RFID) tag. The network interface device 118 may be any type of network communications device allowing the product tag 101 to communicate with other computers or receiver devices 133 via the network 130. In one embodiment, the network interface device 118 is Bluetooth® 4.0 low-energy module. The power source 108 may be any suitable power source, such as a battery. The product tag 101 may include conductive charging pads (not shown) for recharging the power source.

As shown, the product tag 101 may include at least one thermometer 109. The thermometer 109 may be a thermocouple sensor configured to provide probe-based temperature readings of a food product. In another embodiment, the thermometer 109 may additionally or alternatively comprise an ambient temperature sensor which measures the temperature of the medium (such as air) surrounding the food product. In some embodiments, the product tag 101 includes both a probe thermometer 109 and an ambient temperature thermometer 109, thereby allowing the product tag 101 to read the temperature of a food product and the medium surrounding the food product. Generally, the product tag 101 may include any number and type of additional sensors, such as gas sensors, humidity sensors, vibration sensors, and the like.

The storage 110 may be any type of storage. The storage 108 may include the readings 111, which is a data store configured to store temperature (and other data) collected by the product tag 101. The network 130 may be any data network, such as a telecommunications network and/or a wide area network (WAN). In a particular embodiment, the network 130 is the Internet. In at least one embodiment, the product tag 101 may store temperature (and other data) readings in the readings 111 for future transmission, such as when there is no connectivity via the network 130.

As shown, the memory 106 includes the logic 112. The logic 112 may be a set of predefined instructions configured to cause the product tag 101 to read temperatures from the thermometer 109. The logic 112 may then cause the product tag 101 to transmit the temperature readings to receiver device 133 through the network interface 118. The temperature readings may be taken according to predefined timing intervals, such as every 5 minutes, 10 minutes, 15 minutes, and the like. In addition to the temperature readings, the logic 112 may also send timestamps indicating when the temperature readings were taken, and an identifier of the product tag 101, such as the identifier 107. In addition, the product tag 101 may send temperature data to mobile devices through the network interface 118. For example, a Bluetooth enabled mobile device may communicate with the product tag (when in proximity) in order to receive the temperature data from the product tag 101.

In some embodiments, the product tag 101 may be coupled to an output device 124. The output device 124 may be any device for providing output to a user. In one embodiment, the output device 124 may comprise an e-ink display. The logic 112 may be configured to output information on the output device 124, such as attributes of a food product. The attributes may include, without limitation, a name of the food product, nutrition information, allergen information, and the like.

The receiver 133 is configured to receive temperature readings from a plurality of product tags 101. In general, the receiver 133 may be any receiver device configured to receive wireless communications from the product tags 101. In at least one embodiment, the receiver 133 is a Bluetooth 4.0 receiver. The receiver 133 may be configured to send the data transmissions received from the product tags 101 to a computer (not shown) for storage. In addition, the receiver 133 may include location data for the product tags 101 (and the food products being monitored thereby). For example, a first receiver 133 may be configured to receive transmissions from a plurality of product tags 101 that are in a buffet line in a particular restaurant. The first receiver 133 may indicate that the product tags 101 are located in the buffet line of the restaurant (which may be identified by a restaurant ID) when sending received temperature readings from the product tags 101. Similarly, a second receiver 133 may receive transmissions from product tags 101 monitoring temperatures of foods being stored in a kitchen. When receiving transmissions from the product tags 101 in the kitchen, the second receiver 133 may include an indication that the data transmissions are coming from product tags 101 located in the kitchen. As described in greater detail with reference to FIG. 3, any number of receivers 133 and product tags 101 may be configured in any number of locations where food products are located.

Figure 2:
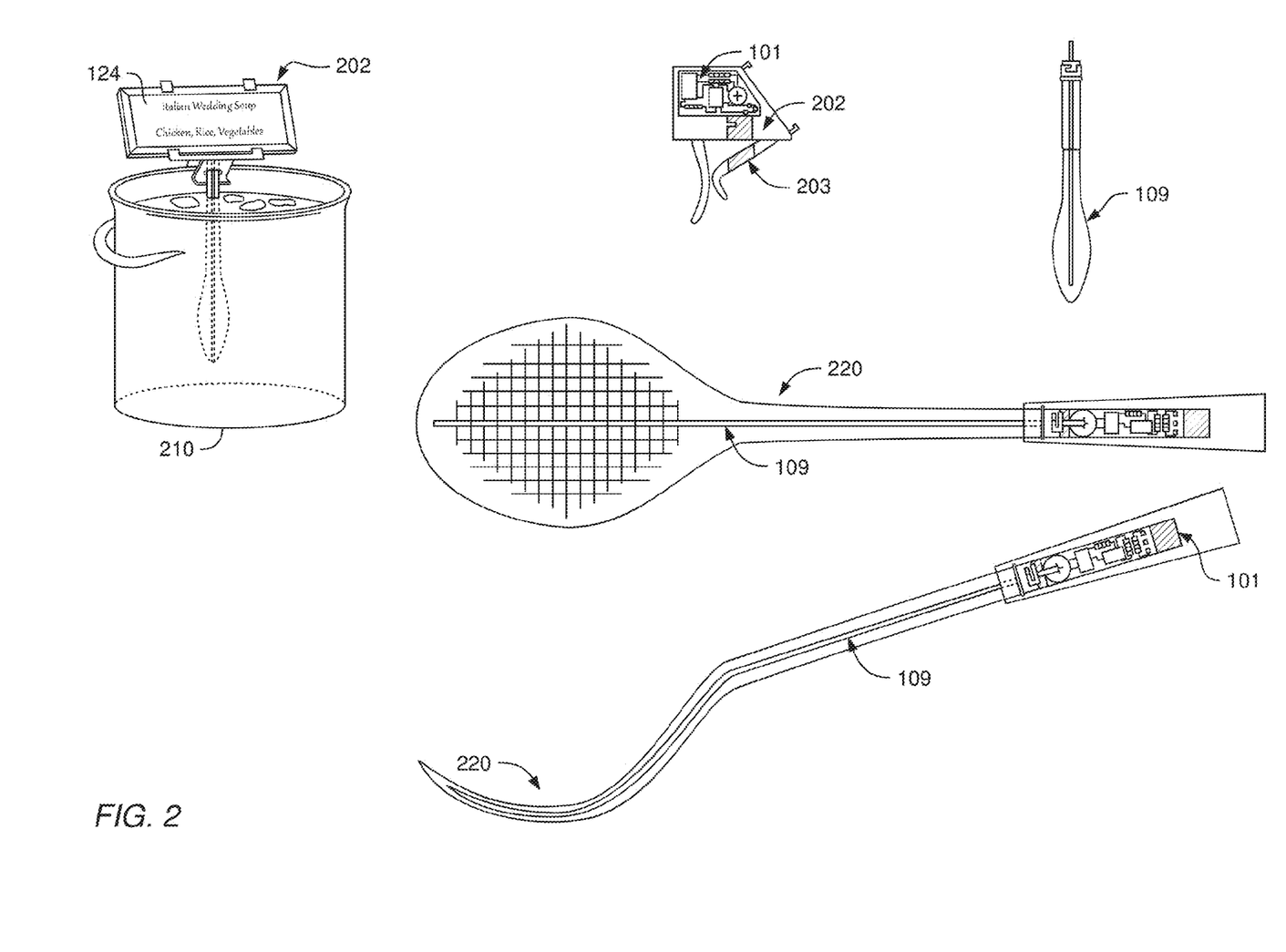
FIG. 2 illustrates different form factors for product tags to monitor food products, according to one embodiment.

FIG. 2 illustrates different form factors of product tags 101 to monitor food products to improve safety, according to one embodiment. Generally, a product tag 101 may take any form suitable to accommodate the hardware elements described in FIG. 1, and the examples depicted in FIG. 2 should not be considered limiting of the disclosure.

As shown, a vessel product tag 202 includes a product tag 101 coupled to an e-ink display 124. The vessel product tag 202 may generally be configured to monitor food products being cooked or stored in serving or cooking vessels, such as bowls, pots, and pans. The vessel product tag 202 includes a mechanical clip 203 for securing the vessel product tag 202 to the serving (or cooking) vessel 210. The thermometer 109 may be a removable temperature thermocouple integrated into a food stimulant. The removable thermometer 109 may facilitate cleaning. The display 124 may be used to provide descriptions of the food products being served to patrons.

As shown, the spoon 220 is a serving utensil incorporating a product tag 101 and the thermometer 109. Similarly, the fork 230 is another serving utensil incorporating the product tag and thermometer 109. Advantageously, the spoon 220 and fork 230 may be placed at serving stations in restaurants to provide precise temperature readings of any food products being served to patrons at the serving stations.

By continuously reading the temperature of the food product being served and the ambient temperature of the surrounding air, the product tags 101 in the vessel product tag 202, spoon 220 and the fork 230 provide increased safety for patrons, by ensuring that all food products maintain safe temperatures, and are stored in locations having appropriate ambient temperatures.

Figure 3:
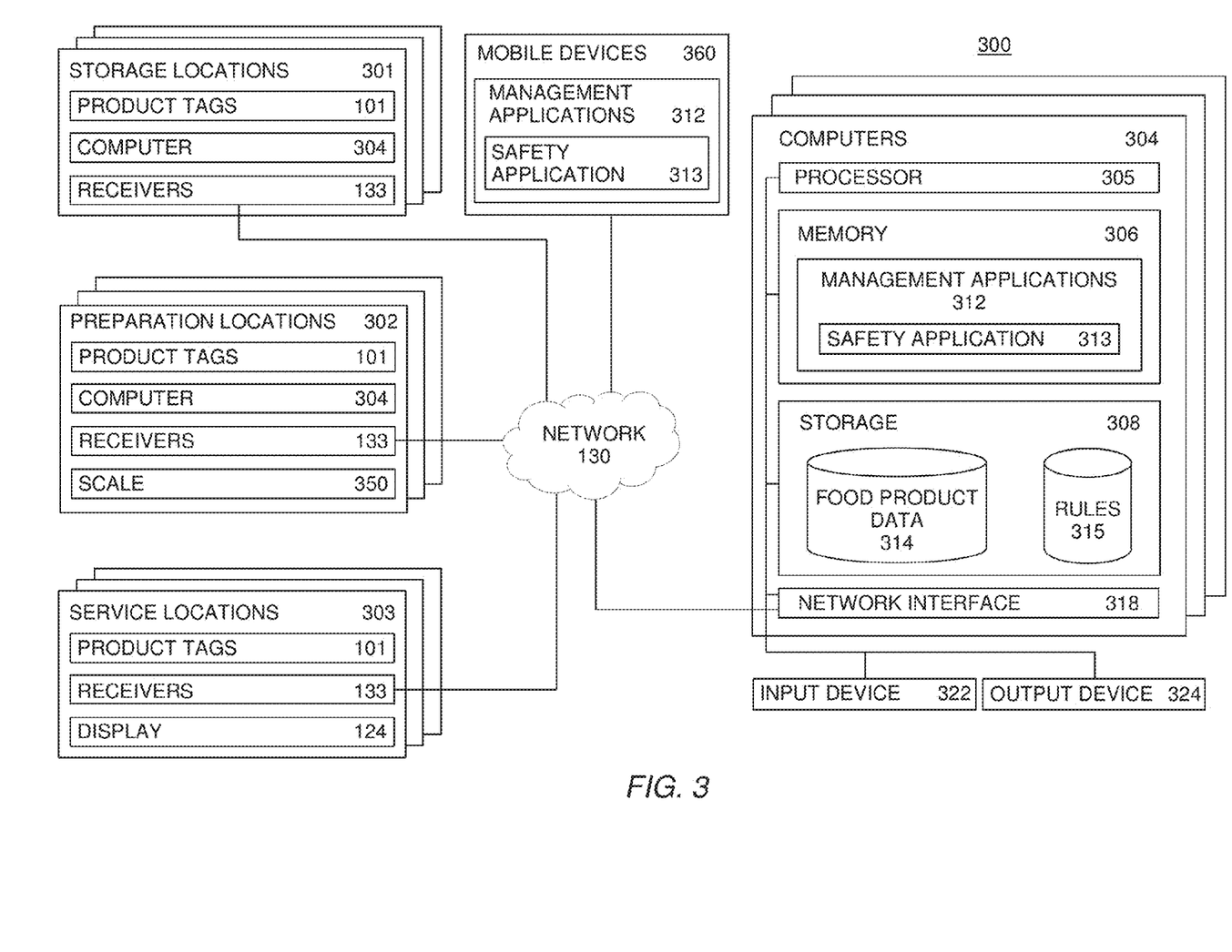
FIG. 3 illustrates a system to monitor food products, according to one embodiment.

FIG. 3 illustrates a system 300 to monitor food products to improve safety, according to one embodiment. Generally, the system 300 is a temperature monitoring solution for food products in a commercial setting. The system 300 includes a plurality of product tags 101 configured to monitor food products in different locations in the commercial setting. The product tags 101 may generally monitor food products and transmit the temperature (or other) data to the receivers 133. The receivers 133 may insert location data for the temperature readings, and send the data to one or more computers 304 via the network 130. The computers 304 may be configured to monitor the received temperature data for abnormalities, such as violation of one or more food safety rules. The computers 304 may also aggregate and store the received data, and generally may perform any operation on (or based on) the received data.

As shown, the system 300 includes storage locations 301, preparation locations 302, and service locations 303 for food products. The storage locations 301 may include any food product storage locations, such as refrigerators, freezers, hot boxes, cabinets, pantries, warehouses, and the like. The preparation locations 302 may include any areas food products are prepared, such as kitchens, outdoor grilling areas, and the like. The preparation locations 302 may include scales 350, which may be used to weight foods pre-consumption and post-consumption to measure waste. The waste may be associated with the product tag and stored in an associated entry in the food product data 314. The scales 350 may include communications technology (such as RFID readers, Bluetooth radios, and the like) that enables the scales 350 to communicate directly with product tags 101. The service locations 303 may include any areas food is kept while being served to patrons, such as buffet lines, carving stations, cafeteria lines, and the like. Generally, the system 300 may include any number of different locations for storing, preparing, and presenting food products for consumption.

As shown, a plurality of product tags 101 are configured to monitor the temperature of the food products at each food product location 301-303. As previously described with reference to FIG. 1, the product tags 101 may monitor the food product temperature (and optionally the ambient temperature) at periodic intervals. The product tags 101 may transmit the temperature data (along with temperature timestamps and an ID of the product tag) to the receiver 133 associated with the respective product tags 101. The receivers 133 may then send the received data, and location data for the product tag 101, to at least one computer 304 for storage.

As shown, the networked system 300 includes at least one computer 304. The computer 304 may also be connected to other computers via a network 330. The computers 304 may also be placed in the storage locations 301, preparation locations 302, and service locations 303 to facilitate access to the food product data 314 as well as the management applications 312. In general, the network 330 may be a telecommunications network and/or a wide area network (WAN). In a particular embodiment, the network 330 is the Internet.

The computer 304 generally includes a processor 305 connected via a bus 320 to a memory 306, a network interface device 318, a storage 308, an input device 322, and an output device 324. The computer 304 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 305 is included to be representative of a single CPU, multiple CPUs, a single CPU having multiple processing cores, and the like. The network interface device 318 may be any type of network communications device allowing the computer 304 to communicate with other computers via the network 330.

The storage 308 may be a persistent storage device. Although the storage 308 is shown as a single unit, the storage 308 may be a combination of fixed and/or removable storage devices, such as fixed disc drives, solid state drives, SAN storage, NAS storage, removable memory cards or optical storage. The memory 306 and the storage 308 may be part of one virtual address space spanning multiple primary and secondary storage devices.

The input device 322 may be any device for providing input to the computer 304. For example, a keyboard and/or a mouse may be used. The output device 324 may be any device for providing output to a user of the computer 304. For example, the output device 324 may be any conventional display screen or set of speakers. Although shown separately from the input device 322, the output device 324 and input device 322 may be combined. For example, a display screen with an integrated touch-screen may be used.

As shown, the memory 306 includes a set of management applications 312. Generally, the management applications 312 may include any type of application that performs any type of function related to food product storage, preparation, ordering, transportation, and service. In at least one embodiment, the management applications 312 implement hazard analysis and critical control points (HACCP) for identification, tracking, and monitoring of perishable and prepared food products. Examples of the management applications 312 include, without limitation, product tracking applications, applications for automated gathering of HACCP data, applications to manage assets and automate trouble tickets, applications to drive heads-up displays in kitchens, applications to provide automated refreshing of food product status, applications to provide automated ordering and replenishment, applications to maximize yield and minimize waste, applications to collect and report real time metrics, applications to provide governmental auditing and compliance reporting, data capture applications, and applications to provide automated alerts based on one or more business rules. The management applications 312 may also be able to provide floor maps or facility photos and/or video captured by cameras throughout the food service facility as part of alerts or other utilities.

One example of a management application 312 is the safety application 313, which is an application generally configured to receive food product data from the receivers 133, store the received data in the food product data 314, and apply the rules 315 to the received (or stored) data. The safety application 313 may further include any of the above described functionality. For example, and without limitation, the safety application 313 may receive a temperature reading from a receiver 133 in a service location 303. The reading may have been recorded by a product tag 101 attached to a service vessel that stores green tea. The safety application 313 may compare the temperature in the received data transmission to a range of temperatures for safe service temperatures of green tea in the rules 315. If the safety application 313 determines that the green tea is currently at a temperature that falls outside of the range of safe temperatures, the safety application 313 may generate an alert to report the problem to food service staff. Example alerts include, without limitation, emails, text messages, popup notifications, direct messages, and text effects such as highlights or bolding for the green tea on a graphical user interface displaying attributes of the green tea.

As shown, the storage 308 includes the food product data 314 and the rules 315. The food product data 314 includes aggregated temperature (or other attribute) readings taken by each of the plurality of product tags 101 in the system 300. The food product data 314 may include, without limitation, the temperature readings, a timestamp the temperature reading was taken, a location where the temperature reading was taken, and an identifier 107 of the product tag 101 that took the reading. Additionally, the food product data 314 may indicate a weight of prepared food products before and after the prepared food products were taken. Further still, the food product data 314 may also include recipe data indicating whether the food was prepared by following a recipe, as the rules 315 may include rules for individual food products as well as recipes including multiple food products. The rules 315 include a plurality of rules for all types of food products. The rules 315 may include temperature ranges, permissible storage times, permissible service times, expiration dates, HACCP rules, and the like. Generally, the rules 315 may include rules related to any type of attribute of food products. In addition, the rules 315 may specify rules for individual food products, as well as combinations of food products that incorporate more than one food product as part of a recipe. Therefore, over time, the rules applicable to a given food product may change as the lifecycle of the food product changes (for example, when a meat is stored raw in a refrigerator, cooked as part of a recipe, stored as a prepared food, and ultimately served for consumption). The rules may change based on the stage of the food product's lifecycle, a point in preparation of the food product, a stage of the operational process, or any other attribute of the food product. In addition, the rules 315 may include rules related to quality and presentation of food products.

As shown, a plurality of mobile devices 360 may be part of the networked system 300. The mobile devices 360 may include instances of the management applications 312 and the safety application 313. In some embodiments, the mobile devices 360 execute versions of the management applications 312 and safety application 313 configured to allow users to receive real-time updates, notifications, alerts, and the like, based on the aggregated food product data 314. The mobile devices 360 may be configured to read data directly from the product tags 101 when they are in proximity to the product tags. For example, and without limitation, the mobile device 360 may include a Bluetooth radio or RFID reader (not pictured), which allows the mobile device 360 to communicate with the product tags 101. The product tags 101 may then communicate directly with the mobile device 360 in order to provide temperature readings and other related data about the food products the product tags 101 are monitoring. Users may then be able to view the condition of the food products and compare the status against the system rules.

Figure 4:
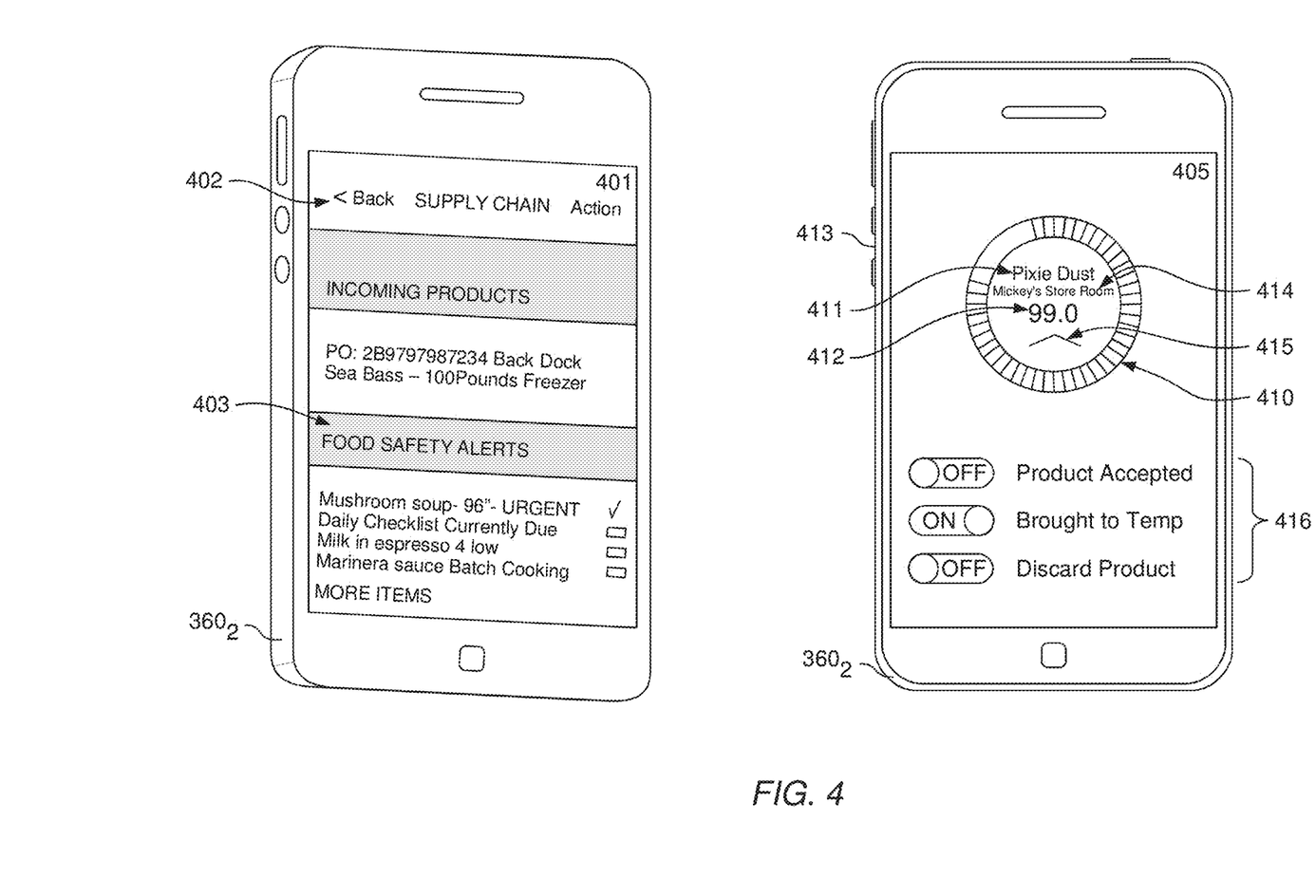
FIG. 4 illustrates graphical user interfaces (GUI) to display food product attributes, according to one embodiment.

FIG. 4 illustrates graphical user interfaces (GUIs) to display food product attributes, according to one embodiment. Generally, embodiments disclosed herein allow users to visualize real-time food product data, metrics, alerts, and other notifications in any form or fashion, and the particular embodiments depicted in FIG. 4 should not be considered limiting of the disclosure. The visualizations may be generated based on a single product tag 101 (and associated food product), multiple product tags 101, or any other class of food products, product tags, business operational units, and the like. For example, as shown, a mobile device $360_1$ has a GUI 401 that includes supply chain notifications 402 and food safety alerts 403 for a given user. In at least one embodiment, the management application 312 (such as the safety application 313) generates the GUI 401. The supply chain notifications 402 may indicate where different food products are stored, delivered, or otherwise located. The food safety alerts 403 may include, without limitation, textual descriptions of different rule violations, notifications to replenish food products, and the like. A user may select any given one of the supply chain notifications 402 and food safety alerts 403 to view additional information.

As another example, as shown, mobile device $360_2$ includes a GUI 405 that displays a product tag visualization 410 and a set of settings 416. In one embodiment, the GUI 405 is generated by bringing the mobile device $360_2$ in proximity with a product tag 101. The product tag 101 may then transmit data (including temperature readings, timestamps, and the like) to a management application 312 (such as the safety application 313) executing on the mobile device $360_2$. The product tag visualization 410 may include a description 411 of the food product, a temperature 412 of the food product, and a location 414 of the food product. An outer ring 413 of the visualization 410 provides a graphic indication of the remaining time the food product may be kept in the current location. A color (not shown) of the outer ring 413 may indicate the location status, while a color of the visualization 410 may specify a HACCP or quality rule violation. An arrow indicator 415 may indicate whether the current temperature of the food product is above or below the current requirement. Changes in the color or shading of the visualization 410 or the outer ring 413 may alert a user to the changed conditions of the food products being monitored. The settings 416 indicate a plurality of different settings related to the food product, such as whether the product was accepted, brought to the proper temperature, or should be discarded.

Therefore, by accessing the GUI 405 for a given product tag 101, a user may be able to determine a number of attributes of a food product associated with the product tag 101. As shown in the GUI 405, a user may determine that pixie dust, stored in Mickey's store room, is currently at 99.0 degrees, which, based on the arrow indicator 415, is too hot according to a rule 315 for the pixie dust. Additionally, the user may determine that the pixie dust has adequate shelf life remaining in the store room, provided that the temperature is brought back within the normal range. Based on the settings 416, the user may determine that the product was not accepted, was brought to temperature, and has not been marked for being discarded. In some embodiments, the user may modify the values of the settings 416.

Figure 5:
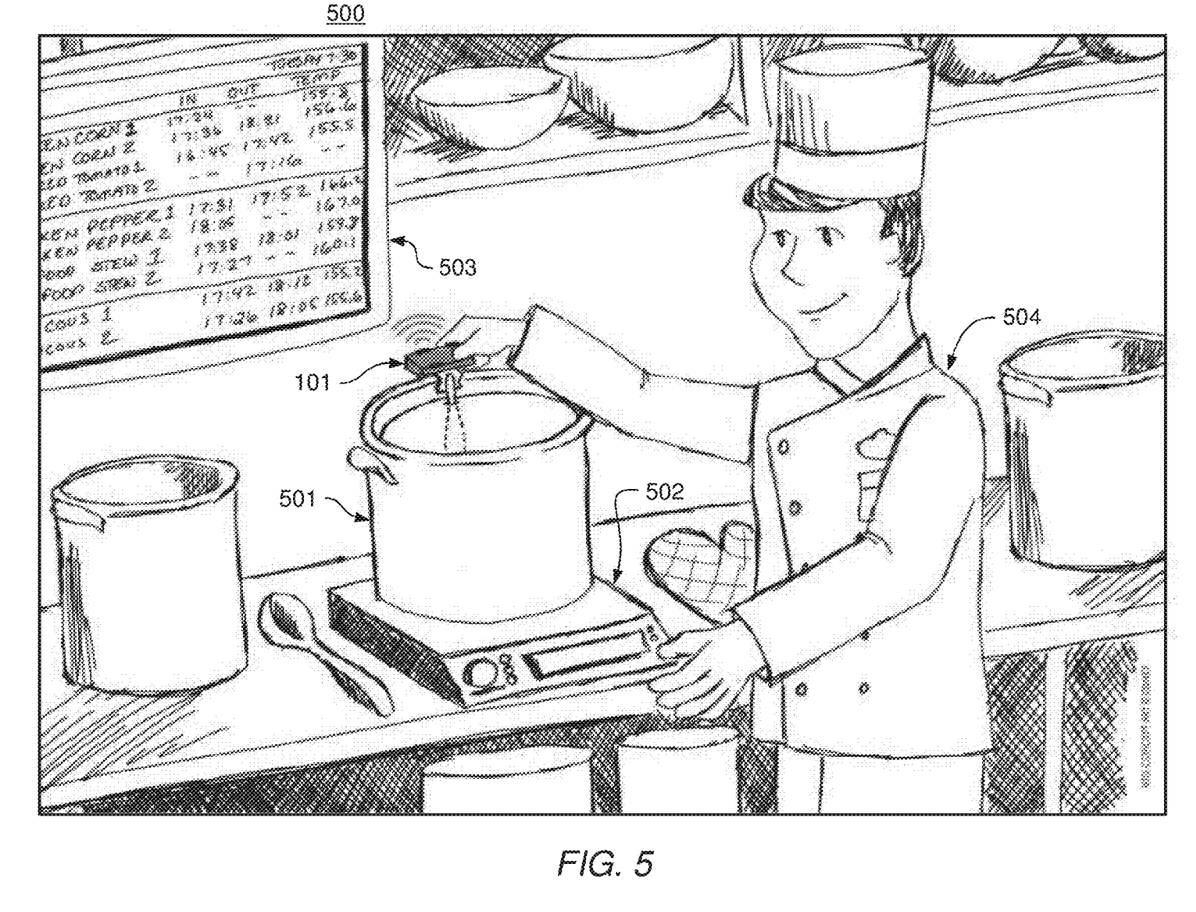
FIG. 5 illustrates a food preparation location utilizing product tags to monitor food products, according to one embodiment.

FIG. 5 is a schematic 500 illustrating a food preparation location utilizing product tags to monitor food products to improve safety, according to one embodiment. As shown, a chef 504 is attaching a product tag 101 to a serving vessel 501. The chef 504 may associate the product tag 101 with the food being prepared in the vessel 501. For example, the chef 504 may access a computer (not shown) to associate the product tag 101 with the food product that is in the vessel 501. In doing so, the chef 504 may select the ingredients that went into the food product, a recipe that may contain a predefined list of ingredients, and the like. A corresponding entry may be created in the food product data 314 for the food product. The chef 504 may also utilize the scale 502 to determine a weight of the food product before and after the food product has been served to customers. The chef 504 may record the weights in an entry for the food product in the food product data 315.

Once the product tag 101 is placed in a position to monitor the temperature of the food product, the product tag 101 may take temperature readings at 15 minute intervals. The product tag 101 may then transmit the temperature readings, timestamps, and the RFID identifier 107 to the receivers 133. The receivers 133 may send the received data from the product tag 101, along with location data of the food product, to the computer 304 for storage in the food product data 314. In addition, the management applications 312 and/or the safety application 313 may constantly enforce the rules in the rules 315 for the food product. As shown, for example and without limitation, the display 503 includes a plurality of different food products, a time the food products were prepared, a time the food products were placed on a buffet for service, and a current temperature of the food products. If the management applications 312 and/or the safety application 313 identify violations of rules 315 based on the received data, these violations may be displayed on the display 503. For example, if the temperature of the stew is too hot or cold, the temperature may be given a text effect (such as bolding, highlighting, etc.) to catch the chef's attention.

Generally, any type of data may be displayed on the display 503. For example, if the only available pot of soup is nearing its maximum storage or service time, a notification to prepare more soup may be displayed on the display 503.

Figure 6:
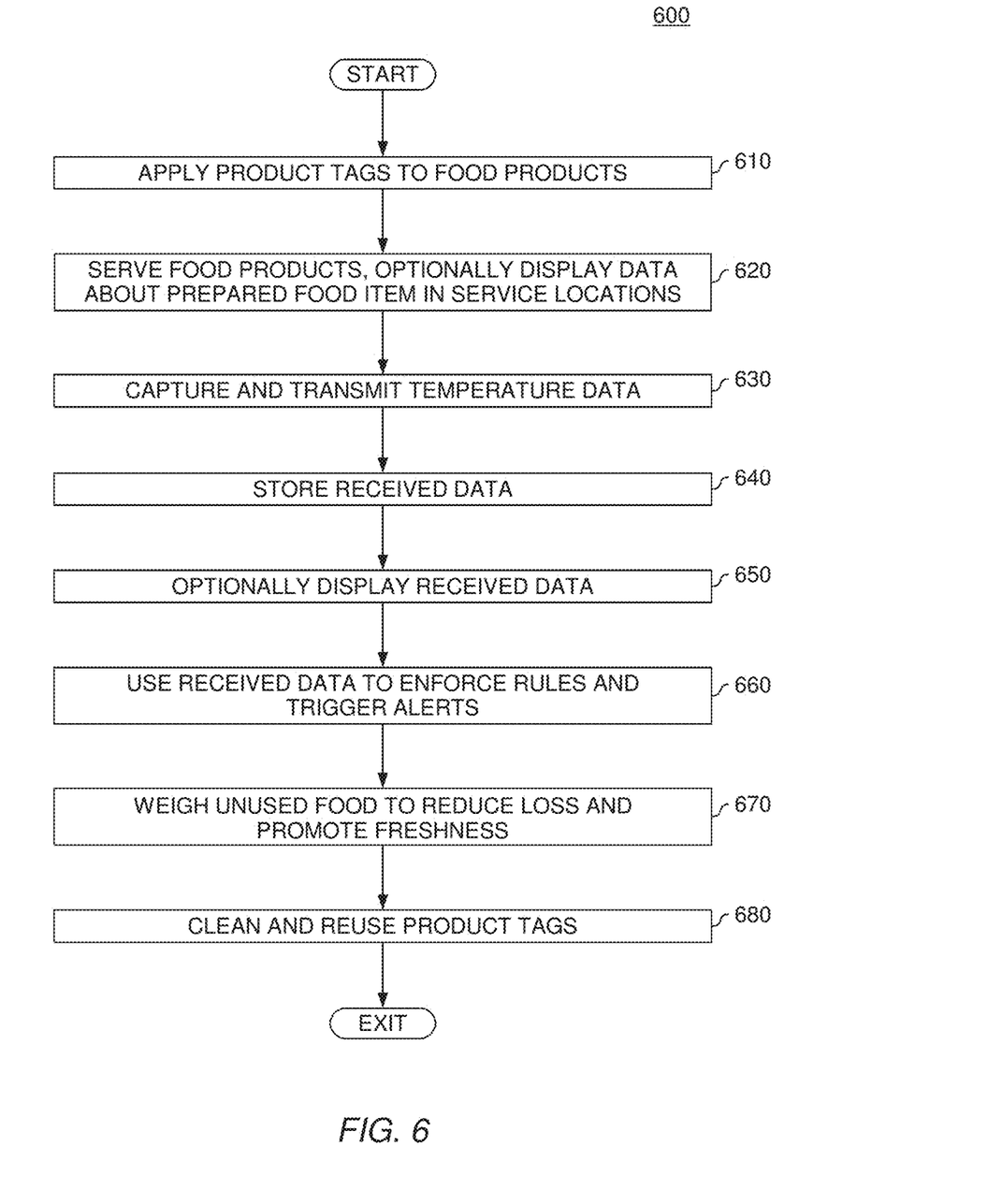
FIG. 6 is a flow chart illustrating a method to monitor food products, according to one embodiment.

FIG. 6 is a flow chart illustrating a method 600 to monitor food products to improve safety, according to one embodiment. Generally, the steps of the method 600 provide for automated, unattended, real-time collection of time, date, temperature, and location of food products, through product tags 101 applied to service containers and service utensils that adhere to quality standards and safety regulations.

At step 610, a user may apply product tags 101 to food products. The product tags 101 may be applied to food products at any point in time. For example, the product tags 101 may be applied to uncooked or unprepared foods when they are received by a warehouse or restaurant. The product tags may also be applied to uncooked or unprepared foods when they are placed in a storage location 301. The user may also apply product tags 101 to food products when the food products are cooked or otherwise prepared. In some embodiments, product tags 101 may be applied only to raw or unprepared food products having a high value. At step 620, food products may be served to customers in service locations. In one embodiment, the food products are served on a buffet line. In some embodiments, the output device 124 (which may be an e-ink display) of the product tag may display data related to the food items being served in service locations. For example, the name of the food product, ingredients, nutrition information, and the like may be displayed on the output device 124.

At step 630, the product tags 101 may continuously transmit temperature (or other readings) data according to predefined timing intervals. As described above, the product tags 101 may take a temperature reading, and send the temperature reading (along with a timestamp and unique identifier of the product tag 101) to a receiver 133. The receiver 133 may send the received data, along with location data for the food product, to at least one computer 304. At step 640, the computer 304 may store the received data in the food product data 314. At step 650, the management applications 312 (including the safety application 313) may optionally display the received data. At step 660, the management applications 312 (including the safety application 313) may use the received (or stored) data in order to enforce rules in the rules 315 and trigger alerts. For example, if a pot of soup exceeds an HACCP guideline, an alert may be sent to a mobile device 360 nearest to the pot of soup in order to allow the user to correct the issue. For example, a fresh pot of soup may replace the pot of soup that has exceeded the HACCP guideline. At step 670, a user may weigh the unused food products to reduce loss and promote freshness. For example, if the food product data 314 reveals an excess waste of 5 pounds per preparation of mashed potatoes, the establishment may prepare less mashed potatoes per preparation. At step 680, the product tags 101 are cleaned and reused on other food products.

Generally, the systems, methods, and computer program products described herein may be applied to any number of different use cases at any stage of the food service cycle. For example, when preparing food to be placed for customer service, a chef may fill a serving vessel with a food product, attach a product tag 101 to the vessel, and weigh the vessel with a digital scale. The chef may then touch a display or interface to marry the food product recipe details to the serving vessel. The product tag 101 may then monitor the food product until it is consumed or removed from the customer service area.

As another example use case, a chef may prepare food products that are to be held in storage for future service. In such an example, the chef may fill a storage vessel with a food product, attach a product tag 101 to the storage vessel, and weigh the vessel on a digital scale to marry the product to the storage vessel. The product tag 101 may include a variety of probes (depending on the type of food product in the vessel) that monitor the food product. The chef may then place the storage vessel in kitchen holding equipment (hot, cold, or room temperature) until ready for service. In the meantime, the product tag 101 may continue to monitor the food product.

As another example use case, bulk food products or multiple batches of food products may be prepared. In such a use case, the chef may initialize a product tag 101 with a bulk food product's data (e.g., as salmon), place the tag 101 (and its probe) in the appropriate product to capture data. The system may then alert the chef if the food product has exceeded any boundaries described herein.

As still another example use case, food products may be used for active service. In such a use case, a chef in a food service line marries tags to smaller vessels for service time quantities. For example, the chef may take 1 pound of potato salad from a larger 20 pound batch of potato salad that will be portioned into individual plates over the course of a service period. The chef would place the product tag 101 on the smaller vessel filled with potato salad, and perform the marry process to connect the tag to the smaller portion of the product. Doing so allows the attributes of the larger batch of potato salad to be carried to the smaller batch, ensuring safety.

In still another example use case, some service settings may not permit for the attachment of product tags, such as when it is impractical to clip product tags to a service vessel. In such a scenario, the chef may use a utensil or tool that includes a product tag in lieu of a physically mounted version of the tag. The tag in the utensil or tool may be married via an interface with the weight of the product and the product recipe.

In another use case, some food products must be constantly monitored. Such food products may have a product tag that is married to the food product with an attached prove that is in contact with the product throughout the food service processes. For example, a product tag 101 would be applied to a pot roast that is being carved into portions and served on a buffet line.

In another use case, some food products require active monitoring. In such cases, chefs using mobile devices or other interfaces receive real-time updates and actions based on product tag conditions reported to the system. The system may then determine what actions should be taken and in what priority, allowing the chef to maintain all safety and quality protocols.

In another use case, foods may be received or delivered by food service locations. A chef may receive a notification that a food product has arrived, as well as information regarding the food product's current condition relative to the rules for that food product. The chef may then make decisions on how to handle the food product, such as accept or reject the food product.

In another use case, customers can use their own devices to view up-to-date information on food products that have product tags. The customers may receive information on products in close proximity to their current location. Additionally, guests may use their mobile phone to determine the ingredients in different food products to ensure their dietary restrictions are met, and that they can safely eat different food products.

In still another use case, a chef may move a product from one location to another. In such a scenario, the chef may use an interface to view the physical progress of a tagged product through service. For example, a bowl of sauce that was initially cooked, then placed in a storage box, then eventually placed for service to customers would be visible to the chef as it moves through the production cycle.

Advantageously, embodiments disclosed herein provide automated solutions to improve food safety for food service establishments. Specifically, the time, date, temperature, and location of food products may be continuously monitored. The data may be stored in a central location, allowing integration with any number and type of applications. When the data is determined to violate one or more rules or policies, notifications may be quickly generated in order to correct the violations. The product tags described herein may take any form factor, and may be configured to wirelessly transmit temperature data (or humidity, gases, vibrations, and the like) according to periodic timing intervals. By applying the product tags to all foods at all times during the storage, preparation, and service cycle, embodiments disclosed herein allow automated, real-time monitoring of all foods, promoting safety at all points in time.

In the foregoing, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access the management applications 312 or related data available in the cloud. For example, the safety application 313 could execute on a computing system in the cloud and store temperature data recorded by product tags 101 in the food product data 315 at a storage location in the cloud.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
a computer processor; and
a memory containing a program which when executed by the processor performs an operation comprising:
receiving transmissions from each of a plurality of receiver devices, wherein each transmission comprises: (i) a unique identifier of a product tag of a plurality of product tags, (ii) a temperature of a food product the product tag is monitoring, (iii) a timestamp of the temperature of the food product, and (iv) a location of the food product, wherein each of the plurality of product tags reads, by a temperature sensor of the product tag, the temperature of the food product the respective product tag is monitoring, wherein each of the plurality of product tags wirelessly transmits the temperature, the timestamp, and the unique identifier by a wireless data transmitter of the product tag, wherein a first product tag of the plurality of product tags is disposed on a food product vessel, and wherein a second product tag of the plurality of product tags is disposed on a food product service utensil;
storing the received data; and
upon determining, based on at least one of the temperature, the timestamp, and a duration of time, that at least a first rule related to at least a first food product has been violated, generating an indication that the first rule has been violated for the first food product.

2. The system of claim 1, wherein a respective external display device is communicably coupled to each product tag located in a food service location, wherein each display device is configured to output one or more attributes of the food product the respective product tag is monitoring.

3. The system of claim 1, the operation further comprising:
determining that a second rule related to a second food product, a third rule related to a third food product, a fourth rule related to a fourth food product, and a fifth rule related to a fifth food product have been violated, wherein the first rule is based on a recipe of a prepared food product, wherein the second rule is based on a safety guideline for storing unprepared food products, wherein the third rule is based on a safety guideline for storing prepared food products, wherein the fourth rule is based on a shelf life of the food product, and wherein the fifth rule is based on a required quality of a served food product, wherein the rules related to the food products are dynamically selected based on at least one of: (i) a state of the respective food product, and (ii) a stage in a lifecycle of the respective food product.

4. The system of claim 3, wherein the product tags are configured to transmit the data according to predefined time intervals, wherein the location of the first food product comprises a storage location, wherein the location of the second food product comprises a preparation location, and wherein the location of the third food product comprises a service location.

5. The system of claim 1, wherein the temperature sensor comprises a probe sensor configured to read the temperature of the food product and an ambient sensor configured to read a temperature of the air surrounding the food product.

6. The system of claim 1, wherein a scale is configured to weigh a prepared food product prior to service to customers and subsequent to service to customers, wherein the weights are used by the computing system to determine an amount of waste for the prepared food product.

7. A computer program product, comprising:
a non-transitory computer-readable storage medium having computer-readable program code embodied therewith, the computer-readable program code executable by a processor to perform an operation comprising:
receiving, at predefined timing intervals and from each of a plurality of product tags, data describing attributes of a respective food product each product tag is configured to monitor, wherein the attributes comprise a temperature of the food product, a time corresponding to the temperature, and a unique identifier of the respective product tag, wherein each of the plurality of product tags comprises a wireless data transmitter, the unique identifier, and a temperature sensor, wherein a first product tag of the plurality of product tags is disposed on a food product vessel, and wherein a second product tag of the plurality of product tags is disposed on a food product service utensil; and
upon determining, based on at least one of the temperature, the timestamp, and a duration of time, that at least a first rule related to at least a first food product has been violated, generating an indication that the first rule has been violated for the first food product.

8. The computer program product of claim 7, wherein each product tag in a food service location is communicably coupled to a respective external display device, wherein the each external display device is configured to output information related to the food product the respective product tag is configured to monitor.

9. The computer program product of claim 7, the operation further comprising:
determining that a second rule related to a second food product, a third rule related to a third food product, a fourth rule related to a fourth food product, and a fifth rule related to a fifth food product have been violated, wherein the first rule is based on a recipe of a prepared food product, wherein the second rule is based on a safety guideline for storing unprepared food products, wherein the third rule is based on a safety guideline for storing prepared food products, wherein the fourth rule is based on a shelf life of the food product, and wherein the fifth rule is based on a required quality of a served food product, wherein the rules related to the food products are dynamically selected based on at least one of: (i) a state of the respective food product, and (ii) a stage in a lifecycle of the respective food product.

10. The computer program product of claim 9, wherein the product tags are configured to transmit the data according to predefined time intervals, wherein the location of the first food product comprises a storage location, wherein the location of the second food product comprises a preparation location, and wherein the location of the third food product comprises a service location.

11. The computer program product of claim 7, wherein a receiver device is configured to:
receive the data from the product tag; and
transmit the temperature, the unique identifier, the timestamp, and the location of the food product to a computing system for aggregation and storage.

12. The computer program product of claim 7, wherein the temperature sensor comprises a probe sensor configured to read the temperature of the food product and an ambient sensor configured to read a temperature of the air surrounding the food product.

13. A method, comprising:
receiving, at predefined timing intervals and from each of a plurality of product tags, data describing attributes of a respective food product each product tag is configured to monitor, wherein the attributes comprise a temperature of the food product, a time corresponding to the temperature, and a unique identifier of the respective product tag, wherein each of the plurality of product tags comprises a wireless data transmitter, the unique identifier, and a temperature sensor, wherein a first product tag of the plurality of product tags is disposed on a food product vessel, and wherein a second product tag of the plurality of product tags is disposed on a food product service utensil; and
upon determining, based on at least one of the temperature, the timestamp, and a duration of time, that at least a first rule related to at least a first food product has been violated, generating an indication that the first rule has been violated for the first food product.

14. The method of claim 13, wherein each product tag in a food service location is communicably coupled to a respective external display device, wherein the each external display device is configured to output information related to the food product the respective product tag is configured to monitor.

15. The method of claim 13, further comprising:
determining that a second rule related to a second food product, a third rule related to a third food product, a fourth rule related to a fourth food product, and a fifth rule related to a fifth food product have been violated, wherein the first rule is based on a recipe of a prepared food product, wherein the second rule is based on a safety guideline for storing unprepared food products, wherein the third rule is based on a safety guideline for storing prepared food products, wherein the fourth rule is based on a shelf life of the food product, and wherein the fifth rule is based on a required quality of a served food product, wherein the rules related to the food products are dynamically selected based on at least one of: (i) a state of the respective food product, and (ii) a stage in a lifecycle of the respective food product.

16. The method of claim 15, wherein the product tags are configured to transmit the data according to predefined time intervals, wherein the location of the first food product comprises a storage location, wherein the location of the second food product comprises a preparation location, and wherein the location of the third food product comprises a service location, wherein the temperature sensor comprises a probe sensor configured to read the temperature of the food product and an ambient sensor configured to read a temperature of the air surrounding the food product.

17. The method of claim 13, wherein a receiver device is configured to:
receive the data from the product tag; and
transmit the temperature, the unique identifier, the timestamp, and the location of the food product to a computing system for aggregation and storage.

18. A system, comprising:
a computer processor; and
a memory containing a program which when executed by the processor performs an operation comprising:
receiving transmissions from each of a plurality of receiver devices, wherein each transmission comprises: (i) a unique identifier of a product tag of a plurality of product tags, (ii) a temperature of a food product the product tag is monitoring, (iii) a timestamp of the temperature of the food product, and (iv) a location of the food product, wherein each of the plurality of product tags reads, by a temperature sensor of the product tag, the temperature of the food product the respective product tag is monitoring, wherein each of the plurality of product tags wirelessly transmits the temperature, the timestamp, and the unique identifier by a wireless data transmitter of the product tag;
storing the received data;
upon determining, based on at least one of the temperature, the timestamp, and a duration of time, that at least a first rule related to at least a first food product has been violated, generating an indication that the first rule has been violated for the first food product; and
determining that a second rule related to a second food product, a third rule related to a third food product, a fourth rule related to a fourth food product, and a fifth rule related to a fifth food product have been violated,
wherein the first rule is based on a recipe of a prepared food product, wherein the second rule is based on a safety guideline for storing unprepared food products, wherein the third rule is based on a safety guideline for storing prepared food products, wherein the fourth rule is based on a shelf life of the food product, and wherein the fifth rule is based on a required quality of a served food product, wherein the rules related to the food products are dynamically selected based on at least one of: (i) a state of the respective food product, and (ii) a stage in a lifecycle of the respective food product.

19. A computer program product, comprising:
a non-transitory computer-readable storage medium having computer-readable program code embodied therewith, the computer-readable program code executable by a processor to perform an operation comprising:
receiving, at predefined timing intervals and from each of a plurality of product tags, data describing attributes of a respective food product each product tag is configured to monitor, wherein the attributes comprise a temperature of the food product, a time corresponding to the temperature, and a unique identifier of the respective product tag, wherein each of the plurality of product tags comprises a wireless data transmitter, the unique identifier, and a temperature sensor;
upon determining, based on at least one of the temperature, the timestamp, and a duration of time, that at least a first rule related to at least a first food product has been violated, generating an indication that the first rule has been violated for the first food product; and
determining that a second rule related to a second food product, a third rule related to a third food product, a fourth rule related to a fourth food product, and a fifth rule related to a fifth food product have been violated,
wherein the first rule is based on a recipe of a prepared food product, wherein the second rule is based on a safety guideline for storing unprepared food products, wherein the third rule is based on a safety guideline for storing prepared food products, wherein the fourth rule is based on a shelf life of the food product, and wherein the fifth rule is based on a required quality of a served food product, wherein the rules related to the food products are dynamically selected based on at least one of: (i) a state of the respective food product, and (ii) a stage in a lifecycle of the respective food product.

* * * * *

UNITED STATES PATENT AND TRADEMARK OFFICE
CERTIFICATE OF CORRECTION

PATENT NO. : 9,477,962 B2
APPLICATION NO. : 14/446396
DATED : October 25, 2016
INVENTOR(S) : John David Worrall et al.

Page 1 of 1

It is certified that error appears in the above-identified patent and that said Letters Patent is hereby corrected as shown below:

On the Title Page

Item (72), in Column 1, in "Inventors", Line 5, delete "Orlanda," and insert -- Orlando, --, therefor.

Signed and Sealed this
Seventeenth Day of January, 2017

Michelle K. Lee
*Director of the United States Patent and Trademark Office*